United States Patent [19]

Packer et al.

[11] Patent Number: 4,603,257

[45] Date of Patent: Jul. 29, 1986

[54] METHOD AND APPARATUS FOR ACCURATE DETERMINATION OF POWDER CONTENT IN FLOWING GAS STREAM

[75] Inventors: Louis L. Packer, Enfield; Urban E. Kuntz, Hartford, both of Conn.

[73] Assignee: United Technologies Corporation, Hartford, Conn.

[21] Appl. No.: 675,801

[22] Filed: Nov. 28, 1984

[51] Int. Cl.[4] .............................................. G01F 23/00
[52] U.S. Cl. .............................. 250/358.1; 250/359.1; 378/54
[58] Field of Search .......................... 250/358.1, 359.1; 378/51, 54; 73/861.01, 199

[56] References Cited

U.S. PATENT DOCUMENTS

| | | | |
|---|---|---|---|
| 2,953,681 | 9/1960 | Frazier | 256/43.5 |
| 3,604,928 | 9/1971 | Starnes et al. | 250/43.5 |
| 4,044,259 | 8/1977 | Wyton et al. | 250/360 |
| 4,180,185 | 12/1979 | Yamamoto et al. | 378/51 |
| 4,182,957 | 1/1980 | Forster et al. | 378/54 |
| 4,186,306 | 1/1980 | Necker et al. | 378/54 |
| 4,285,245 | 8/1981 | Kennedy | 73/199 |

*Primary Examiner*—Janice A. Howell
*Attorney, Agent, or Firm*—Charles E. Sohl

[57] ABSTRACT

Accurate measurements are made of powder entrained in a flowing gas stream. Measurements are made of the flowing gas stream prior to powder entrainment and x-ray measurement techniques are made to determine characteristics of the combined materials. An equation is disclosed for calculating the mass flow rate of the powder material from these measurements.

2 Claims, 2 Drawing Figures

METHOD AND APPARATUS FOR ACCURATE DETERMINATION OF POWDER CONTENT IN FLOWING GAS STREAM

DESCRIPTION

1. Technical Field

The technical field of the invention is that of accurate real time measurement of particulate material in flowing gas stream.

2. Background Art

Researchers in a variety of fields have sought accurate techniques for measuring flowing powder. In particular in the art of thermal spraying (plasma or flame) there has been a long felt need for devices for accurately measuring and controlling plasma spray powder flows. Attempts have been made to measure powder weight on a continuous basis, to measure the acoustic properties of the flowing gas and powder stream, and to measure the resonant frequency of a U-shaped tube through which the powder-gas mixture is flowing. These techniques have all suffered from one or more defects which have rendered them unsuited for long-term commercial use.

DISCLOSURE OF INVENTION

The invention relates to a method and device for measuring the amount of powder entrained in a flowing carrier gas stream. The apparatus includes a mass flow sensor and a pressure sensor for characterizing the flow of the carrier gas and a sensor using penetrating radiation for measuring the attenuation characteristics of the carrier gas after entrainment of the powder. Knowing the flow rate and pressure of the carrier gas and the radiation measured density of the combined mixture, a calculation can be made which provides a highly accurate measure of the mass flow rate of the entrained powder.

The foregoing and other objects, features and advantages of the present invention will become more apparent from the following description of preferred embodiment and accompanying drawings.

BEST MODE FOR CARRYING OUT THE INVENTION

The apparatus described has been developed for application to the plasma spraying of fine metallic and ceramic particles but it will be appreciated that the invention has a variety of other applications and that the following description is meant to be informative rather than limiting of the invention.

Figure 1:
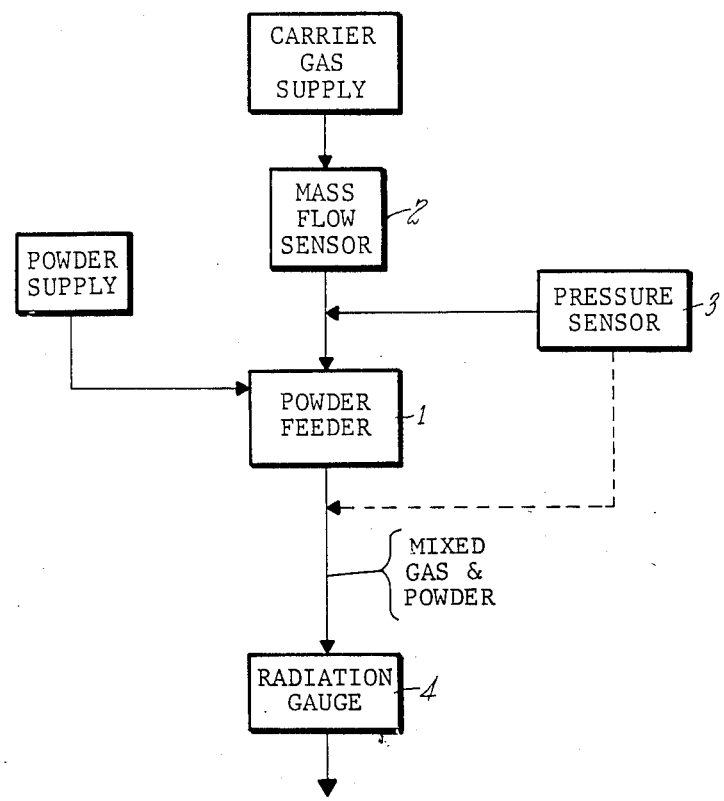
FIG. 1 is a block diagram of a measurement system according to the invention.

FIG. 1 shows a block diagram of the components of the apparatus of the present invention. Central to the apparatus of FIG. 1 is a powder feeder 1 which is of conventional nature. The particular powder feed apparatus employed is one commercially available from the Plasmadyne Corporation which employs a horizontally disposed rotating disk having a plurality of apertures near its rim. The disk is rotated so that the apertures periodically cover an uncover an aperture in an underlying stationary disk. The amount of powder passing through the aperture in the stationary disk is related to the rotational speed of the disk which in turn is controllable by external means so that the powder flow rate can be varied at will. A variety of other powder dispensing apparatuses are commercially available and the particular method of dispensing the powder is not relevant to the present invention so long as the flow rate can be varied at will. A stream of carrier gas enters the powder feeder after passing through a carrier gas mass flow sensor 2. In the particular embodiment described the mass flow sensor 2 is a commercially available device supplied by the Mathison Corporation, a sensor which operates on the general principle of measuring gas mass flow by measuring heat transfer from a heater to a downstream temperature sensor. It will be noted that the carrier gas mass flow is measured prior to the powder entrainment.

It has also been found desirable to measure the carrier gas pressure. This is accomplished by a commercially available gauge 3 supplied by the Setra Corporation which is a conventional nature. Strictly speaking, the gas pressure sensor would not be necessary if the gas pressure could be totally regulated and held constant. Experimentally, however, it has been determined that the flow of the entrained powder particles is irregular and causes variations in the carrier gas pressure which adversely affect the accuracy of the measurement unless the gas pressure is sensed and used to correct the particle mass flow equation which will be described below. The pressure measurement refinement may not be required under all circumstances. As shown in dotted lines in the Figure, the carrier gas pressure sensor may be arranged either upstream or downstream of the powder feeder 1. It is preferred, however, to have the pressure sensor 3 upstream of the powder feeder 1 so as to avoid potential problems which result from ingestion of powder by the pressure sensor 3.

After the powders entrained in the gas stream by the powder feeder 1, the mixed stream passes through a radiation sensor 4 which senses the relative density of the mixed gas and particulate stream by measuring the attenuation of the transmitted beam of radiation. Several key aspects are necessary for the successful functioning of the radiation transmission gauge.

Figure 2:
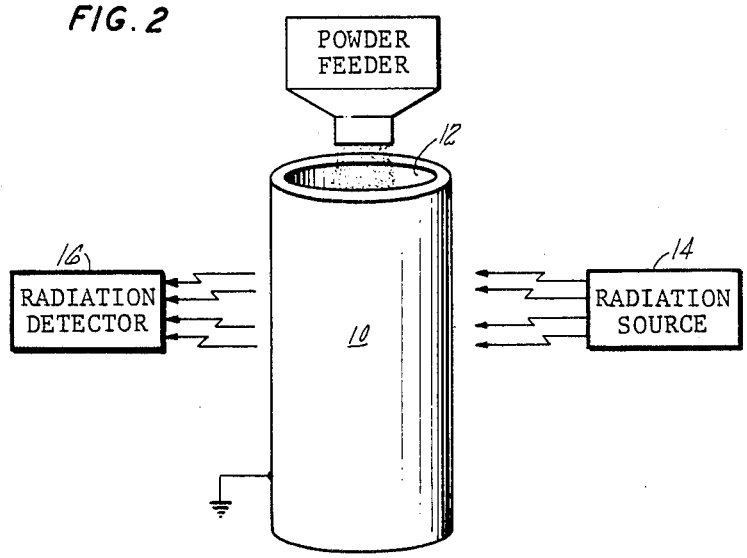
FIG. 2 is a schematic of the radiation measuring sensor of the invention.

FIG. 2 shows a drawing of the radiation transmission gauge which has been developed for this application. The flowing stream of mixed particulate and carrier gas passes through a thin wall tube 10 which is transmissive of the radiation selected. We have found that graphite of the type commercially available from POCO Division of Union-76 Corporation and described as high density (1.74 gms./cm$^3$) extremely high strenght EDM electrode material is a suitable material for this application. The atomic number of carbon is sufficiently low that the x-ray beam employed passes readily through the tube with minimal attenuation. While it was initially feared that the errosive nature of the mixed stream of gas and particulate material would cause failure of the graphite tube 10, this has not proved to be a problem, the tube 10 is sufficiently durable for hundreds of hours of use and is cheap and readily replaceable when needed. The tube 10 must be electrically conductive and must be well grounded.

This requirement of conductivity and grounding arises from the need to neutralize electrical static charges which inevitably arise in flowing powders and to prevent static caused buildup of powder on the tube walls which would occur if the tube was not conductive or not grounded. The presence of a powder buildup on the tube walls 12 is fatal to accurate measurements. In addition to carbon, beryllium and/or beryllia appear to be candidate materials, although toxicity may be a problem. It may also possible to use some of the conductive plastic materials which are commercially available and which usually consist of a plastic matrix containing substantial quantities of carbon particles.

The radiation source 14 employed must be selected to be sufficiently powerful so as to penetrate the tube walls but must not be so powerful as to pass through the flowing particulate materials unimpeded. In the present case where a graphite tube having a diameter of approximately one quarter of an inch and wall thicknesses of about ten mils is employed, an iron 55 isotope source has been used with great success. Iron 55 decays to form manganese and produces thereby a characteristic x-ray radiation having a characteristic intensity of about 5.9 KeV. This radiation has proved to be ideal for the measurement of flowing streams of nickel alloy, ceramic and plastic powders, but other sources such as Krypton 85 and nickel 65 might be used as well.

An ion chamber is a suitable detecting means for the gauging system. Having determined the pressure and mass flow of the carrier gas and the radiation attenuation caused by the combined stream of particulate material and carrier gas, the mass flow rate of the particulate material can be calculated using the following equation $$\text{Powder Mass Flow Rate} = [F + A]\frac{nIo/I}{PM}$$

In this equation F is the mass flow of the carrier gas, A is a constant which equals the cross-sectional area of the tube times standard gas density times the gravitational velocity in still gas at one atmosphere, Io is the radiation intensity observed when the gas is flowing with no entrained powder and I is the radiation intensity observed when the gas plus powder stream is flowing. M is an attenuation coefficient. In practice M and A are experimentally determined at at least two different gas flow rates by flowing powder through the gauge for a fixed period of time and weighing the resultant powder while measuring the relative amounts of transmitted radiation. In the event that it is found not to be necessary to incorporate the pressure, it may be equal to 1 in the equation.

Although this invention has been shown and described with respect to a preferred embodiment, it will be understood by those skilled in this art that various changes in form and detail thereof may be made without departing from the spirit and scope of the claimed invention.

We claim:

1. Apparatus for determining the mass flow rate of powder material entrained in a flowing gas stream including:
  a. means for sensing the mass flow rate of the carrier gas prior to powder entrainment;
  b. means for measuring carrier gas pressure;
  c. means for entraining the powder in the carrier gas;
  d. means for measuring the combined density of the carrier gas and the entrained powder by passing penetrating radiation through the flowing stream;
  e. means for calculating the powder mass flow rate according to the equation $$\text{Powder Mass Flow Rate} = [F + A]\frac{\text{Log}(Io/I)}{PM}$$

where
F = mass flow rate of carrier gas,
A = cross sectional area of the tube X gravitational velocity of particles in still gas X gas density,
Io = radiation transmission through gas without powder,
I = radiation transmission through flowing gas and powder combination,
M = attenuation coefficient,
P = pressure
wherein M and A can be determined by calibration.

2. An instrument for measuring the radiation absorption of particulate material in a flowing gas stream including:
  a. a tube for passage of said particulate material in said gas stream, said tube being composed essentially of graphite, and being conductive, grounded, and substantially transmissive of the radiation emanating from
  b. a source of penetrating radiation which includes iron 55 as a radioactive isotope;
  c. a detector for detecting said radiation after it passes through said tube.

* * * * *